United States Patent
Cho et al.

(10) Patent No.: US 9,232,486 B2
(45) Date of Patent: *Jan. 5, 2016

(54) METHOD AND APPARATUS FOR TRANSMITTING SYNCHRONIZATION SIGNALS IN AN OFDM BASED CELLULAR COMMUNICATIONS SYSTEM

(71) Applicant: Samsung Electronics Co., Ltd., Gyeonggi-do (KR)

(72) Inventors: Joon-Young Cho, Gyeonggi-do (KR); Ju-Ho Lee, Gyeonggi-do (KR); Yong-Jun Kwak, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,845

(22) Filed: Oct. 28, 2014

(65) Prior Publication Data

US 2015/0043694 A1 Feb. 12, 2015

Related U.S. Application Data

(63) Continuation of application No. 13/431,574, filed on Mar. 27, 2012, now Pat. No. 8,873,488, which is a continuation of application No. 12/161,436, filed as application No. PCT/KR2007/000262 on Jan. 16, 2007, now Pat. No. 8,175,029.

(30) Foreign Application Priority Data

Jan. 18, 2006 (KR) .................. 10-2006-0005408

(51) Int. Cl.
*H04W 56/00* (2009.01)
*H04J 11/00* (2006.01)
*H04L 25/03* (2006.01)
*H04L 5/00* (2006.01)
*H04L 27/26* (2006.01)

(52) U.S. Cl.
CPC ........... *H04W 56/00* (2013.01); *H04J 11/0069* (2013.01); *H04L 5/003* (2013.01);

(Continued)

(58) Field of Classification Search
CPC .......... H04W 72/04; H04B 7/216; H04J 3/06
See application file for complete search history.

(56) References Cited

U.S. PATENT DOCUMENTS 6,480,558 B1 * 11/2002 Ottosson et al. .............. 375/350
6,856,611 B2   2/2005 Chaudhuri et al.
(Continued)

FOREIGN PATENT DOCUMENTS

| KR | 1020020056986 | 7/2002 |
| KR | 1020050018296 | 2/2005 |
| KR | 1020050039263 | 4/2005 |

OTHER PUBLICATIONS

Tanno et al., "Three-Step Cell Search Algorithm Exploiting Common Pilot Channel for OFCDM Broadband Wireless Access", IECE Trans. Communication, vol. E86-B, No. 1, Jan. 2003.

*Primary Examiner* — Kodzovi Acolatse
(74) *Attorney, Agent, or Firm* — The Farrell Law Firm, P.C.

(57) ABSTRACT

A method and apparatus are provided for transmitting a synchronization signal for cell search in an Orthogonal Frequency Division Multiplexing (OFDM) communications system. The method includes identifying a primary synchronization sequence; identifying a secondary synchronization sequence associated with a cell identifier; mapping the primary synchronization sequence based on center subcarriers in a first OFDM symbol; mapping the secondary synchronization sequence based on the center subcarriers in a second OFDM symbol; transmitting the mapped primary synchronization sequence in the first OFDM symbol; and transmitting the mapped secondary synchronization sequence in the second OFDM symbol. The second OFDM symbol is adjacent to the first OFDM symbol, and the center subcarriers are part of a system bandwidth and a part of the center subcarriers is not used for mapping the secondary synchronization sequence.

12 Claims, 23 Drawing Sheets

(52) U.S. Cl.
CPC ........... *H04L 5/0016* (2013.01); *H04L 5/0048* (2013.01); *H04L 25/03866* (2013.01); *H04L 27/2626* (2013.01); *H04L 5/0007* (2013.01); *H04L 27/2656* (2013.01)

(56) References Cited

U.S. PATENT DOCUMENTS

| | | |
|---|---|---|
| 7,289,494 B2 | 10/2007 | Lakkis |
| 2003/0223384 A1* | 12/2003 | Sengupta et al. .............. 370/320 |
| 2004/0085946 A1* | 5/2004 | Morita et al. ................. 370/342 |
| 2006/0114812 A1 | 6/2006 | Kim et al. |
| 2007/0076668 A1* | 4/2007 | Tirkkonen et al. ............ 370/335 |
| 2007/0140106 A1* | 6/2007 | Tsai et al. ..................... 370/208 |
| 2010/0157884 A1 | 6/2010 | Haga et al. |

* cited by examiner

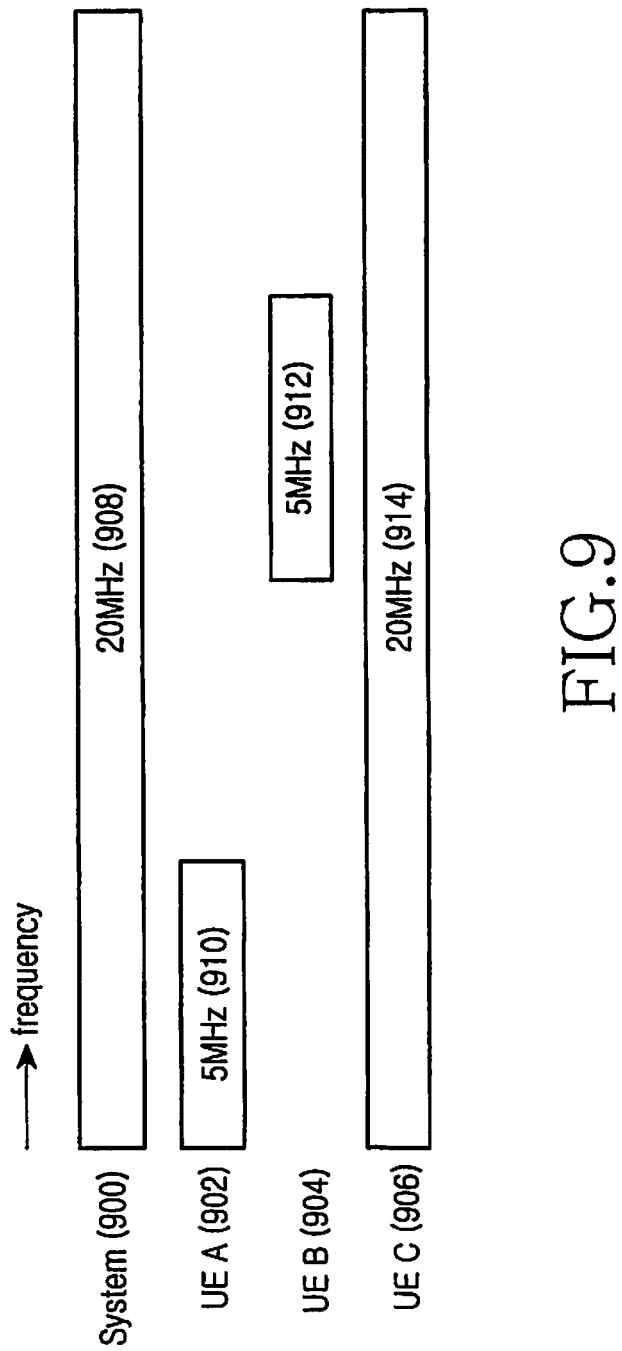

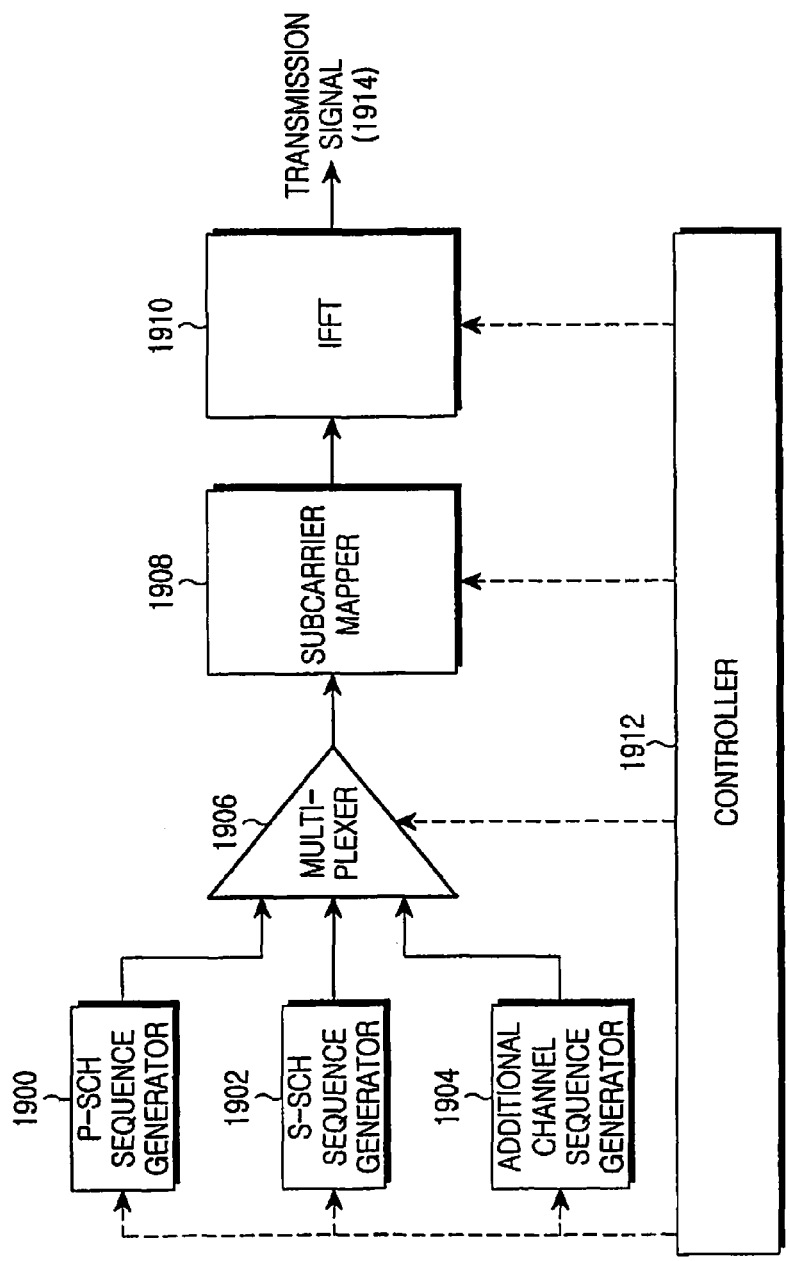

METHOD AND APPARATUS FOR TRANSMITTING SYNCHRONIZATION SIGNALS IN AN OFDM BASED CELLULAR COMMUNICATIONS SYSTEM

PRIORITY

This application is a Continuation application of U.S. application Ser. No. 13/431,574, filed in the U.S. Patent and Trademark Office on Mar. 27, 2012, which is a Continuation Application of U.S. application Ser. No. 12/161,436, filed in the U.S. Patent and Trademark Office on Nov. 24, 2008, issued as U.S. Pat. No. 8,175,029, and claims priority to PCT Application PCT/KR2007/000262, filed on Jan. 16, 2007, which claims priority to an application filed in the Korean Industrial Property Office on Jan. 18, 2006 and assigned Serial No. 10-2006-0005408, the entire contents of each of which are incorporated herein by reference.

BACKGROUND OF THE INVENTION

1. Field of the Invention

The present invention relates to the structure of a downlink synchronization channel and cell search for obtaining synchronization in an Orthogonal Frequency Division Multiplexing (OFDM) based cellular communications system.

2. Description of the Related Art

Recently, the OFDM technology has been widely applied to broadcast and mobile communication systems. The OFDM technology enables the radio communication channel to be cleared from multipath interferences, secures the orthogonality between multiple access users, and makes it possible to effectively use frequency resources. OFDM is more useful for high speed data transmission and broadband communications systems, compared to the CDMA (Code Division Multiple Access) technology. The cellular radio communications requires synchronization and cell search between the transmitter and the receiver in order to demodulate the received data and control information.

FIG. 1 illustrates the Dedicated Physical CHannel (DPCH) for data transmission applied to the WCDMA (Wideband CDMA) cellular communications standard downlink, according to the conventional art. As shown in FIG. 1, a radio frame 102 of 10 ms consists of 15 slots, each including 2560 chips, each having a length of 3.84 Mcps. The downlink synchronization and cell search (hereinafter "cell search") is a process of detecting the frame starting point of the physical channels transmitted and cell-specific scrambling code applied to the physical channel transmission in the cell where the user exists.

In the WCDMA system, user equipment such as a mobile communication terminal obtains the synchronization of the slot timing in the first step of the cell search. In the second step, it obtains the group of cell-specific scrambling codes applied to the frame timing synchronization and corresponding cell. Next, it searches the cell-specific scrambling codes belonging to the obtained cell code group in order to obtain the cell-specific scrambling code applied to the base station.

Thus, the user equipment may demodulate the received data and control channels by obtaining the frame timing synchronization and scrambling code information of the cell to which it belongs, and consequently detect the cell IDentifier (ID) through the demodulation of Broadcasting CHannel (BCH). In the asynchronous communications system, the cell search is performed by detection of the scrambling code group, and detection of the cell-specific scrambling code as described above since there are numerous possible cell-specific scrambling codes.

FIG. 2 illustrates the frame structure in the time region in the conventional ODFM based system. In FIG. 2, a single radio frame 202 consists of L (#0, #1, #2, ..., #(L−1)) OFDM symbols 200. The frame structure may also be described in the frequency region, as shown in FIG. 3. The OFDM technology is a multi-carrier transmission technology that enables the data and control channel information to be divided among multiple subcarriers and transmitted parallel.

FIG. 3 illustrates the frame structure of OFDM transmission signals both in the frequency and the time region.

In FIG. 3, a single OFDM symbol 300 consists of N (#0, #1, #2, ..., #(N−1)) subcarriers 302 in the frequency region. Each subcarrier 302 carries the modulation symbol 304 of the information transmitted parallel. The OFDM symbol structure may be represented in the time region as shown in FIG. 4.

Referring to FIGS. 3 and 4, applying Inverse Fast Fourier Transform (IFFT) having a size of N to the N subcarrier symbols 302, gives the values of N samples 408 $s_0, s_1, \ldots, s_{N-1}$. The OFDM symbol 404 is produced by copying M samples $(s_{N-M}, \ldots, s_{N-2}, s_{N-1})$ 406 in the rear portion of the N samples onto the front end 410 of the OFDM symbol. The M samples portion copied onto the front end is called the Cyclic Prefix (CP) 400, and the original N samples portion is called the Useful symbol 402.

Considering the frame structure of the OFDM system described above, a similar cell search process may be applied to the OFDM based cellular radio communications system as in the WCDMA system. For example, the cell search process of the OFDM based system proposed in the article "Three-Step Cell Search Algorithm Exploiting Common Pilot Channel for OFCDM Broadband Wireless Access" by M. Tanno, H. Atarashi, K. Higuchi, and M. Sawahashi, IEICE Trans. Commun. Vol. E86-B, No. 1, January 2003 (hereinafter reference article) also consists of three steps. Namely, the same process as in the WCDMA is performed, except that the first step consists of OFDM symbol timing synchronization instead of slot timing synchronization, because the OFDM system requires the OFDM symbol as the basic unit for constituting the frame, as shown in FIG. 2.

Considering the OFDM symbol structure of FIG. 4, the OFDM symbol timing may be detected by using the fact that the samples constituting the CP 400 are the same as the M samples 406 in the rear part of the Useful symbol interval. The remaining two steps are the same as in the WCDMA system, wherein the second step is to obtain the frame timing synchronization and the scrambling code group, and the third step is to detect the cell-specific scrambling code.

However, the procedure of obtaining the synchronization in the second step is very complicated and overly time-consuming with respect to obtaining the synchronization based on obtaining both the frame synchronization and the cell code group search. This problem causes a cell search delay when the user equipment needs to be handed over to another cell. The problem of the second step is closely connected with the structure of the downlink synchronization channel. In the synchronization channel structure proposed in the reference article, the subcarriers belonging to the first OFDM symbols carry the cell group code, while the other symbols carry the cell-specific scrambling code. This frame structure requires the user equipment to detect the group containing the scrambling code applied to its cell in order to detect the frame starting point.

The problem concerning obtaining the frame synchronization may be resolved by repeating the same sequence in the time region, as in the synchronization channel structure specified in the Institute of Electrical and Electronics Engineers (IEEE) 802.16 standard, as shown in FIG. 5. The synchronization preamble OFDM symbol 500 as shown in FIG. 5 consists of three repeated sequences 502, 504 and 506 arranged at the front-most portion of the frame.

More specifically, the three sequences 502, 504 and 506 may be represented by multiplying an arbitrary complex number $e^{iq}$ with a size of 1 between one another. The user equipment determines the frame starting point by detecting the preamble 500. Even if the user equipment does not have the correct information on the pattern of the sequences 502, 504 and 506 in the preamble, it may obtain the frame synchronization through the preamble detected by searching out the OFDM symbol timing producing the three same sequences 502, 504 and 506. This process does not require the user equipment to know the sequences applied to the preamble, and therefore achieves more desirable frame synchronization than applying the synchronization channel structure proposed in the reference article.

The IEEE 802.16 system provides the same synchronization for the transmission signals between base stations, which uses a single OFDM symbol 500 to constitute the synchronization channel enabling the user equipment to successfully carry out the cell search, as shown in FIG. 5. However, in the asynchronous system or the synchronous system with numerous possible cell-scrambling codes, the preamble consisting of a single OFDM symbol as described above has difficulty ensuring the performance and structure for smoothly obtaining the downlink frame synchronization and the cell-specific scrambling code. Hence, the synchronization channel generally consists of two or more OFDM symbols so as to divide the process of obtaining the frame timing synchronization and cell-specific code into multiple steps as in the previous WCDMA system. In this case, the method of constituting the synchronization channel influences the performance and complexity of each step of carrying out the cell search.

SUMMARY OF THE INVENTION

It is an object of the present invention to provide the structure of a downlink synchronization channel for enabling fast cell search in a system employing a synchronization channel consisting of at least two OFDM symbols.

It is another object of the present invention to provide the structure of a synchronization channel for enabling the user equipment nearing a cell boundary to be immediately handed over to an adjacent cell by smoothly carrying out the cell search.

It is still another object of the present invention to provide the structure of a synchronization channel for enabling the user equipment nearing a cell boundary to smoothly carry out the cell search by minimizing the interferences from the adjacent cells in a system supporting the scalability of the system and user equipment bandwidth.

It is a further object of the present invention to provide a method for enabling the user equipment nearing a cell boundary to improve performance of obtaining the frame synchronization by combining the synchronization channels from the adjacent channels.

According to an aspect of the present invention, a method for communication is provided, which includes identifying a primary synchronization sequence; identifying a secondary synchronization sequence associated with a cell identifier; mapping the primary synchronization sequence based on center subcarriers in a first OFDM symbol; mapping the secondary synchronization sequence based on the center subcarriers in a second OFDM symbol; transmitting the mapped primary synchronization sequence in the first OFDM symbol; and transmitting the mapped secondary synchronization sequence in the second OFDM symbol. The second OFDM symbol is adjacent to the first OFDM symbol, and the center subcarriers are part of a system bandwidth and a part of the center subcarriers is not used for mapping the secondary synchronization sequence.

According to another aspect of the present invention, an apparatus for communication is provided, which includes a generator configured to identify a primary synchronization sequence and to identify a secondary synchronization sequence associated with a cell identifier; a mapper configured to map the primary synchronization sequence based on center subcarriers in a first OFDM symbol and to map the secondary synchronization sequence based on the center subcarriers in a second OFDM symbol; and a transmitter configured to transmit the mapped primary synchronization sequence in the first OFDM symbol and to transmit the mapped secondary synchronization sequence in the second OFDM symbol. The second OFDM symbol is adjacent to the first OFDM symbol, and the center subcarriers are part of a system bandwidth and a part of the center subcarriers is not used for mapping the secondary synchronization sequence.

According to another aspect of the present invention, a method for communication is provided, which includes receiving a first OFDM symbol of a frame, the first OFDM symbol including a primary synchronization sequence; and receiving a second OFDM symbol in the frame, the second OFDM symbol including a secondary synchronization sequence associated with a cell identifier. The primary synchronization sequence is mapped based on center subcarriers in the first OFDM symbol and the secondary synchronization sequence is mapped based on the center subcarriers in a second OFDM symbol, the second OFDM symbol is adjacent to the first OFDM symbol, and the center subcarriers are part of a system bandwidth and a part of the center subcarriers is not used for mapping the secondary synchronization sequence.

According to an aspect of the present invention, an apparatus for communication is provided, which includes a receiver configured to receive a first OFDM symbol of a frame, the first OFDM symbol including a primary synchronization sequence, and to receive a second OFDM symbol in the frame, the second OFDM symbol including a secondary synchronization sequence associated with a cell identifier. The primary synchronization sequence is mapped based on center subcarriers in the first OFDM symbol and the secondary synchronization sequence is mapped based on the center subcarriers in a second OFDM symbol, the second OFDM symbol is adjacent to the first OFDM symbol, and the center subcarriers are part of a system bandwidth and a part of the center subcarriers is not used for mapping the secondary synchronization sequence.

BRIEF DESCRIPTION OF THE DRAWINGS

The above and other objects, features and advantages of the present invention will become more apparent from the following detailed description when taken in conjunction with the accompanying drawing in which:

FIG. 9 illustrates an example of the case where the user equipments with different bandwidths exist in the system bandwidth in a system supporting a scalable bandwidth;

FIG. 19 illustrates a transmitter for producing the synchronization channel according to the present invention.

DETAILED DESCRIPTION OF EMBODIMENTS OF THE INVENTION

Various embodiments of the present invention will be described herein below with reference to the accompanying drawings. In the following description, well-known functions or constructions are not described in detail for the sake of clarity and conciseness. The terminology used in this description should be interpreted according to the functions of the inventive system considering the objects of the present invention.

The present invention concerns the synchronization channel structure for carrying out the downlink cell search in an OFDM-based cellular system. The synchronization channel structure of the invention is based on the process of carrying out the cell search through the following two steps:

First Step: Obtaining frame timing synchronization using the Primary Synchronization CHannel (P-SCH).

Second Step: Obtaining cell-specific scrambling code using the Secondary Synchronization CHannel (S-SCH).

As described above, if the cell search is performed by separating the step of obtaining the frame timing synchronization and the step of obtaining the cell group scrambling code, both the performance of obtaining the frame timing and the complexity of the cell search may be improved. The present invention provides a synchronization channel structure suitable to each step in order to maximize the performance of obtaining the synchronization in each step of the cell search. It may be required to obtain the cell group code prior to obtaining the cell-specific scrambling code according to the system, and in this case, the present invention performs the step of obtaining the cell group code after the first step of obtaining the frame timing synchronization.

The basic concept of the synchronization channel structure disclosed in the present invention is based on the fact that all cells may apply the same code to the P-SCH for obtaining the frame synchronization in the first step of the cell search, and in the second step of obtaining the cell-specific scrambling code, each cell applies a different code to the S-SCH. Hence, the P-SCH is set with a frequency reuse factor of 1 to be transmitted over the same frequency resource in all the cells, so that the user equipment may combine the P-SCH from several cells to smoothly obtain the framing timing synchronization, and correctly evaluate the frequency error between the user equipment and the base station.

The S-SCH is set with a frequency reuse factor greater than 1, considering the cell ID generally used in the S-SCH, so that adjacent cells may employ different frequency resources for transmitting the S-SCH in order to prevent S-SCH interferences between the adjacent cells. Namely, the S-SCH is used to improve the performance of obtaining the cell-specific scrambling code.

Example 1

Figure 1:
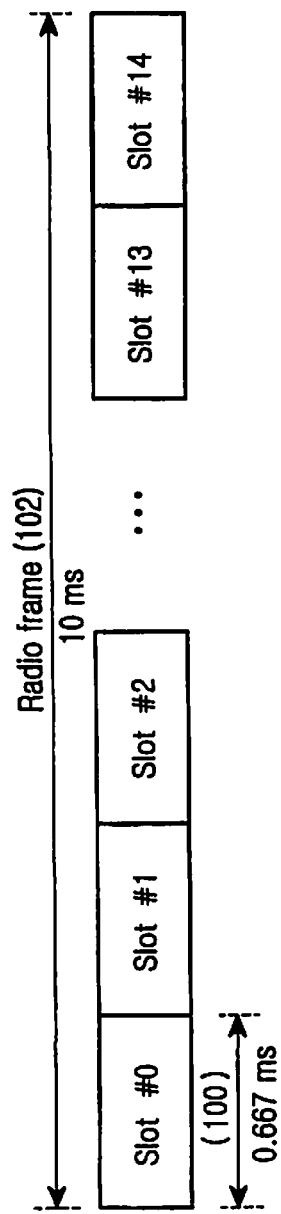
FIG. 1 illustrates the frame structure of the physical channel in a conventional WCDMA system.
Figure 2:
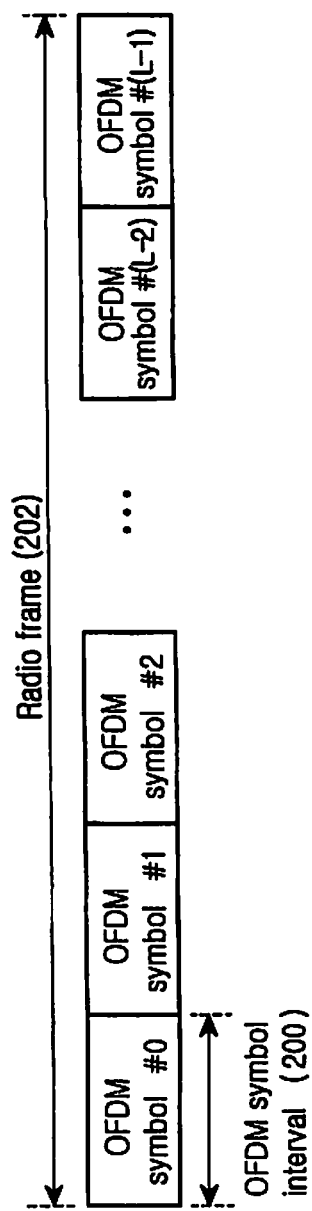
FIG. 2 illustrates the frame structure in the time region in a conventional OFDM-based system.
Figure 3:
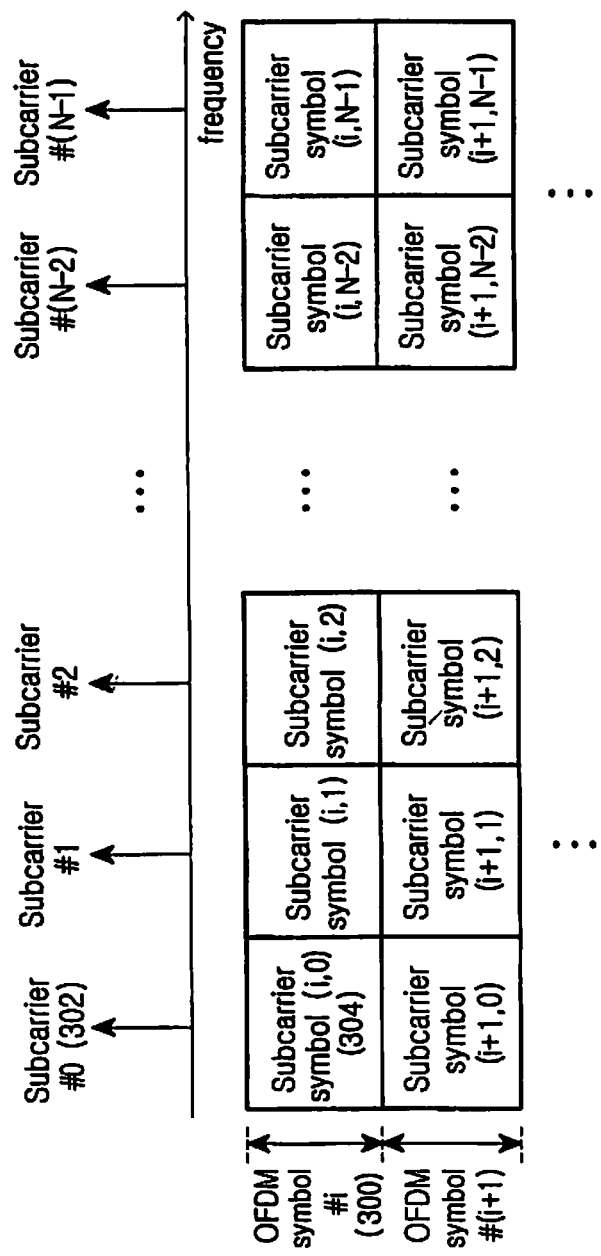
FIG. 3 illustrates the structure of a conventional OFDM transmission signal both in the frequency region and in the time region.
Figure 4:
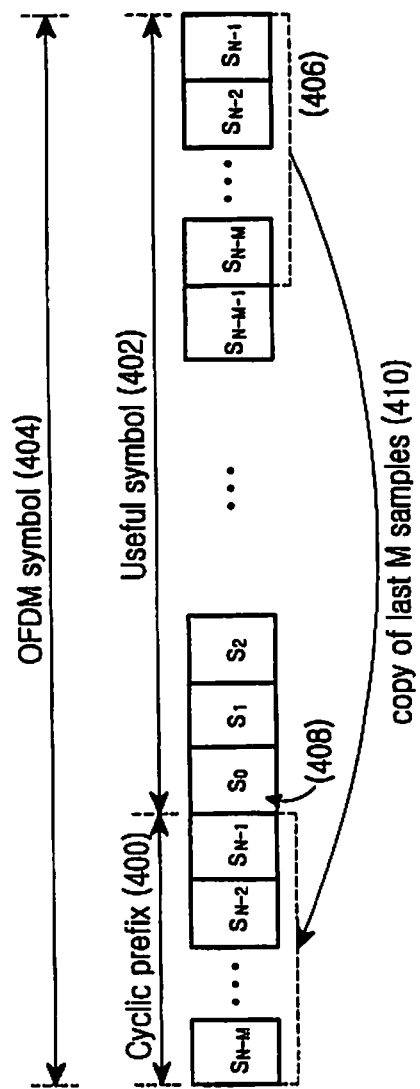
FIG. 4 illustrates the structure of a conventional OFDM symbol in the time region.
Figure 5:
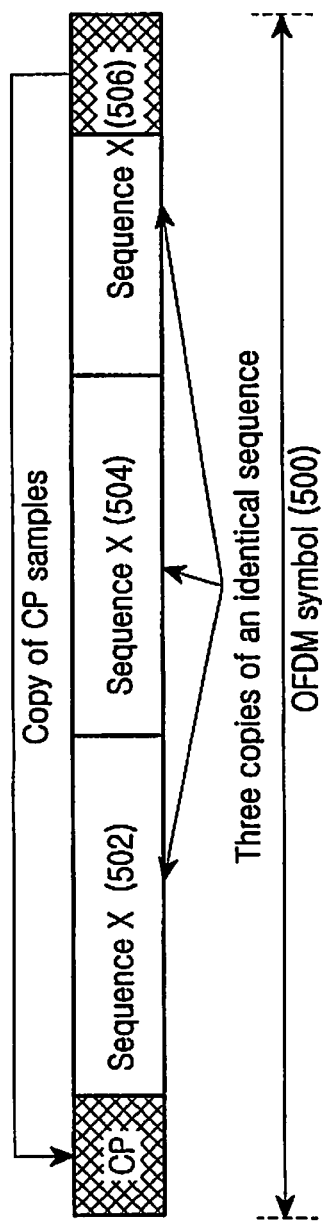
FIG. 5 illustrates the structure of a conventional preamble for obtaining the downlink synchronization.
Figure 6A:
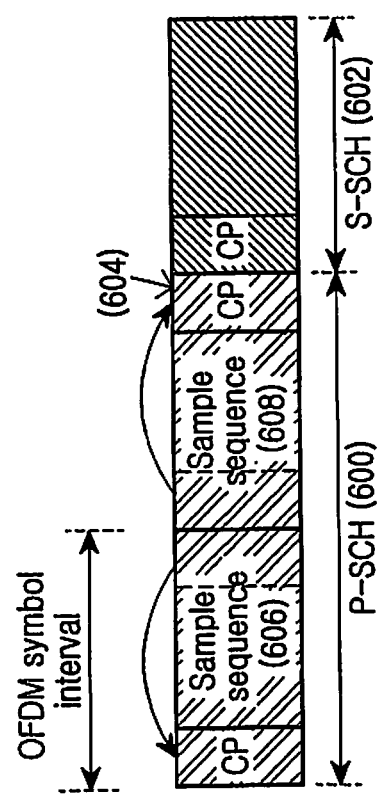
FIG. 6A illustrates the structure of the synchronization channel according to a first embodiment of the present invention, in the time region.

In FIG. 6A which illustrates the synchronization channel structure according to a first embodiment of the present invention in the time region, the P-SCH 600 is transmitted over two OFDM symbols, and the S-SCH 602 is transmitted over a single OFDM symbol. The P-SCH 600 is used to obtain the downlink frame timing synchronization, and the S-SCH 602 is used to obtain the cell-specific scrambling code.

The sequence is the same for the two OFDM symbols constituting the P-SCH 600 in the time region. The CP 604 of the second OFDM symbol is placed behind the useful symbol interval, as shown in FIG. 6A, so that the user equipment may correctly estimate the frequency error amounting to many subcarrier spacings between the base station and the user equipment. The position and existence of the CP 604 in the P-SCH 600 is not described in detail because it does not relate to the object of the present invention.

Figure 6B:
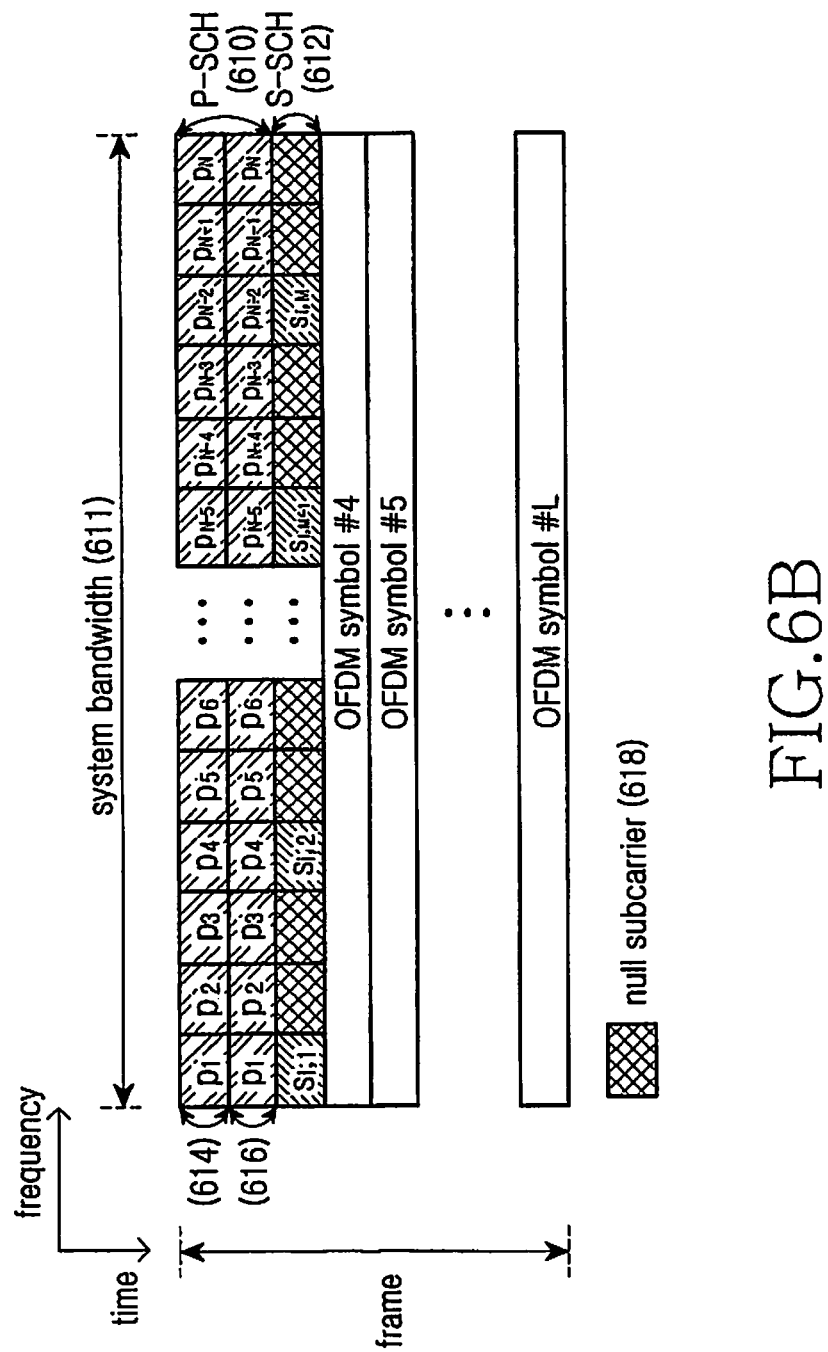
FIG. 6B illustrates the structure of the synchronization channel according to a first embodiment of the present invention, both in the frequency region and in the time region.

In FIG. 6B which illustrates the synchronization channel structure according to a first embodiment of the present invention, both in the time region and in the frequency region, the sequence $p_n$ (n=1, 2, . . . , N) applied to the P-SCH 610 is repeated in two OFDM symbol intervals, and the symbols $p_n$ constituting the sequence of a length N of the P-SCH 610 are carried by respective subcarriers. The sequence of the P-SCH 610 is the same for the first and second OFDM symbols 614 and 616, and therefore, the OFDM sample sequence obtained by subjecting the P-SCH 610 to IFFT becomes the same.

Although the P-SCH 610 and S-SCH 612 are transmitted over the OFDM symbols adjacent to the starting point of the frame, as shown in FIG. 6B, it causes no problem for the successful downlink cell search to employ other OFDM symbols adjacent to or separate from one another for the transmission, provided that there be ensured the index of the OFDM symbol for transmitting the synchronization channel between the user equipment and the base station. Therefore, the present invention has no limitation to the position of the synchronization channels in the frame.

In FIG. 6B, the sequences $p_n$ (n=1, 2, . . . , N) of the P-SCH 610 are transmitted over all the subcarriers, while the sequences $s_{i,m}$ (m=1, 2, . . . , M) of the S-SCH 612 are separately mapped to the subcarriers with a spacing of three subcarriers, and the null subcarriers 618 between the S-SCH sequences carry no signal, wherein i represents the cell-specific sequence index. In the first embodiment of the present invention, it is assumed that the P-SCH 610 is applied with the same sequence, and the S-SCH 612 with the cell-specific sequence.

Figure 6C:
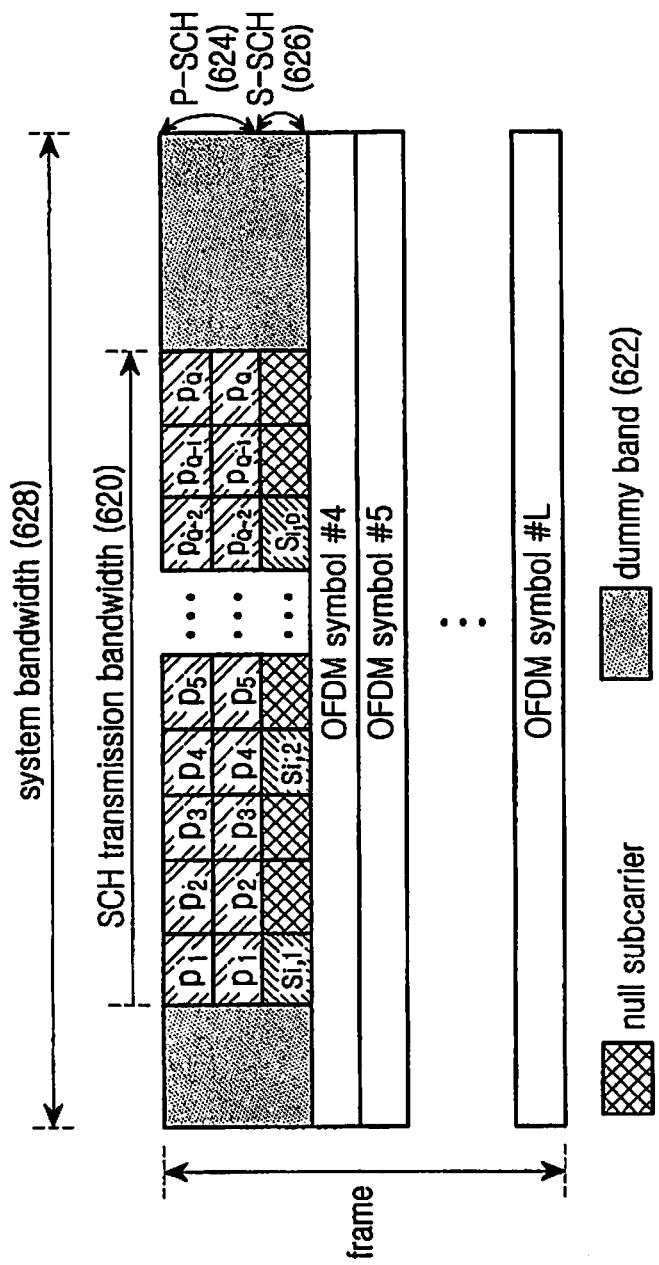
FIG. 6C illustrates the structure of the synchronization channel according to a first embodiment of the present invention, both in the frequency region and in the time region, when the synchronization channel is transmitted over a part of the system bandwidth.

FIG. 6B illustrates the synchronization channel transmitted over the entire system bandwidth 611, while FIG. 6C illustrates the synchronization channel transmitted over a part 620 of the system bandwidth 628. In FIG. 6C, the dummy band 622 not used for the synchronization channel transmission may carry other channels or no signal. In this case, the sequences carried by the P-SCH 624 and S-SCH 626 become shorter than in FIG. 6B using the whole system bandwidth (Q<N). The method of applying the frequency reuse factor differently to the P-SCH and S-SCH hereinafter described is also used for the cases of FIGS. 6B and 6C.

Figure 7:
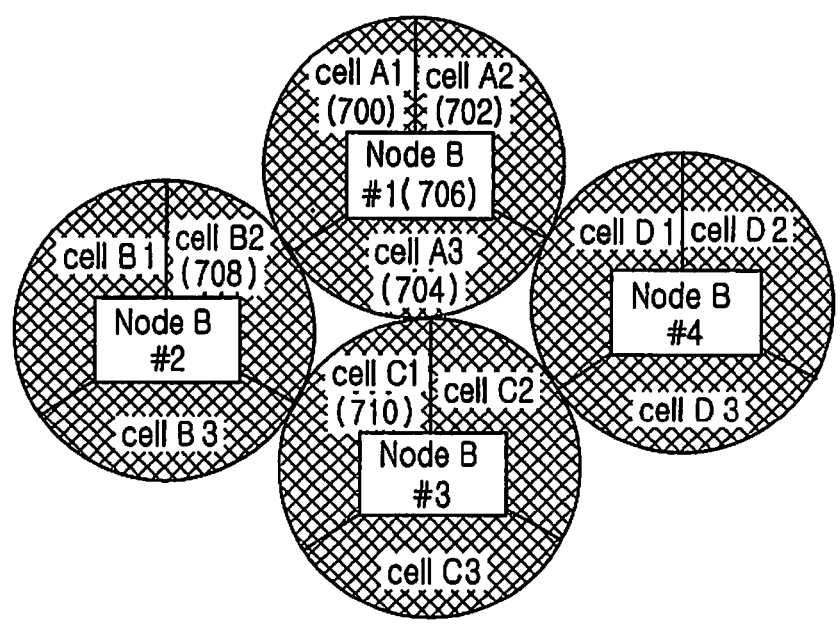
FIG. 7 illustrates an example of a multi-cell model according to a first embodiment of the present invention.

FIG. 7 illustrates a system consisting of three cells for each node B, in order to describe the mapping of the S-SCH among the cells according to a first embodiment of the present invention. In FIG. 7, node B #1 706 consists of three cells A1 700, A2 702 and A3 704, and the other nodes B #2, B #3 and B #4 each exist likewise. In this cell structure, the user equipment existing in the boundary between the cells A1 700 and A3 704 receives signals of similar power from the two cells 700 and 704. All the cells apply the same sequence for the P-SCH, and the cells under the same node B generally apply the same transmission time, so that the user equipment soft-combines the P-SCH from both cells A1 700 and A3 704, resulting in its received power being higher than from each cell. Thus the P-SCH may be more effectively detected. On the contrary, the S-SCH is applied with different codes among the cells, so that the S-SCH may not be soft-combined to cause S-SCH interferences between the cells using the same frequency resource, which is different from the case of the P-SCH.

Figure 8A:
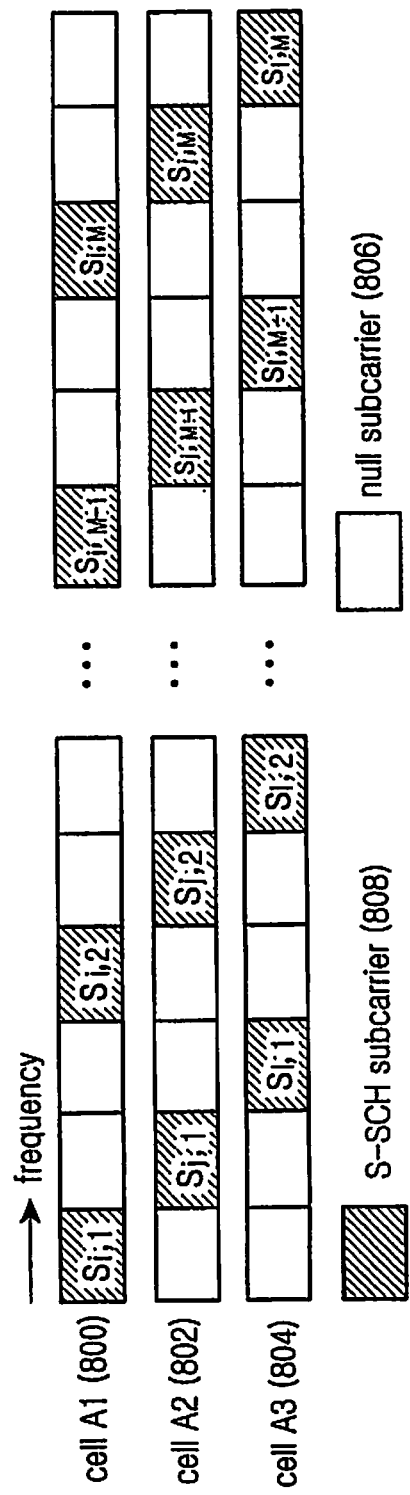
FIG. 8A illustrates an example of transmitting each cell's S-SCH over a different dispersed frequency resource by defining the frequency reuse factor as 3 among the cells belonging to the same node B according to a first embodiment of the present invention.
Figure 8B:
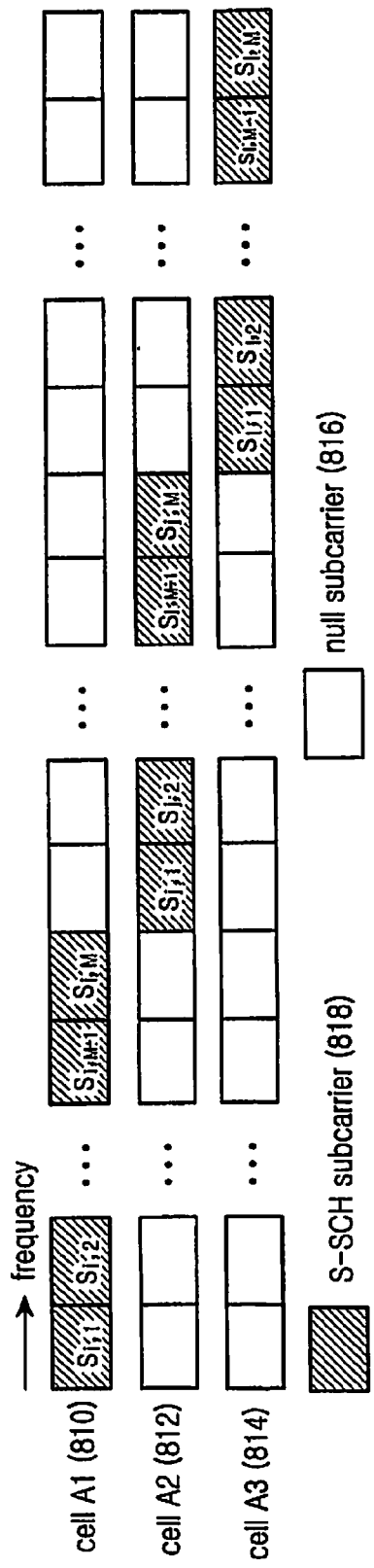
FIG. 8B illustrates an example of transmitting each cell's S-SCH over a different subcarrier by defining the frequency reuse factor as 3 among the cells belonging to the same node B according to a first embodiment of the present invention.

FIGS. 8A and 8B illustrate the S-SCH frequency resource mapping among cells according to a first embodiment of the present invention. In FIG. 8A, the frequency reuse factor is set to 3 so as to make the cells A1 800, A2 802 and A3 804, under the same node B, use different subcarriers for transmitting the S-SCH, thereby producing no S-SCH interferences between the cells 800, 802 and 804. Meanwhile, the data subcarriers 808, 818 carry the S-SCH sequence symbols of corresponding cells, and the null subcarriers 806, 816 do not carry any signals.

In FIGS. 8A and 8B, the symbols $\{s_{i,m}\}, \{s_{j,m}\}, \{s_{l,m}\}$ are the S-SCH sequences carried by the respective data subcarriers 808, 818 of the cells A1, A2 and A3, wherein the subscripts i, j, and l represent the indexes of the corresponding S-SCH sequences.

As described above, the first embodiment of the present invention has set the frequency reuse factor of the S-SCH to 3, but another value may be used to allocate frequency resources for the S-SCH with minimized interferences between adjacent cells.

In FIG. 8A, the subcarriers are used with a spacing of three subcarriers so that the cells may not be overlapped, whereby the S-SCH code of each cell is carried by the corresponding subcarrier, spread over the entire bandwidth or the sub-bandwidth (see 620 in FIG. 6C) allocated for the S-SCH transmission. In contrast, the S-SCH structure as shown in FIG. 8B illustrates the entire bandwidth or the sub-bandwidth allocated for the S-SCH transmission divided into three bands, each consisting of two adjacent subcarriers for carrying the S-SCH in each cell.

The structure of FIG. 8A enabling the frequency resources used for the S-SCH transmission to be spread and interleaved among the cells is advantageous compared to the structure of FIG. 8B. First, the structure of FIG. 8A may have a greater frequency diversity gain than FIG. 8B because each cell transmits the S-SCH spread widely. Second, if the S-SCH is spread over the entire system bandwidth for transmission in a system supporting a scalable bandwidth, the user equipment supporting a smaller bandwidth than the base station bandwidth may receive the S-SCH of an adjacent cell to carry out the cell search, even in handover.

FIG. 9 illustrates that the User Equipments (UEs) A 902, B 904 and C 906 are provided with the services of a system 900 with 20 MHz bandwidth 908. UE A 902 has a communication range of 5 MHz, receiving the signals from the left 5 MHz bandwidth 910. UE B 904 also has a range of 5 MHz, and receives the services from the central bandwidth 912 of the entire bandwidth 20 MHz, and UE C 906 receives services from the entire bandwidth 914 of 20 MHz.

Referring to FIGS. 8B and 9, UE A 902, receiving data from the bandwidth 910, cannot receive the S-SCH from the cells A2 812 and A3 814 under the S-SCH structure of FIG. 8B, because the S-SCH from the cells A2 812 and A3 814 is transmitted in different bandwidths from the bandwidth of UE A 902 in FIG. 8B. Hence, in order for UE A 902 to receive the S-SCH from the cells A2 812 and A3 814, the time for performing the cell search should be agreed upon between the system and UE A 902. Namely, in the agreed upon cell search time, UE A 902 must move to the bandwidth transmitting the S-SCH from the cell A2 812 or A3 814 in order to receive the S-SCH to be used for the cell search. However, if the user equipment cannot receive the synchronization channel of an adjacent cell, and also receives it only in a particular period, fast handover is restricted, and the process of obtaining the synchronization becomes complicated.

In the case of the P-SCH transmitted over the entire bandwidth as shown in FIG. 6B, UE A 902 may always receive the whole or a part of the P-SCH sequence regardless of the bandwidth occupied by UE A 902. The S-SCH structure of FIG. 8A, as distinguished from that of FIG. 8B, enables the S-SCH sequences from the cells A1 00, A2 802 and A3 804 to be spread over the entire bandwidth for transmission, so that the UE with a smaller bandwidth than the system bandwidth may receive the S-SCH from an adjacent cell regardless of the bandwidth presently receiving data. Namely, UE A 902 may receive only the sequence part transmitted over its 5 MHz bandwidth, from among the S-SCH sequences transmitted over the entire bandwidth from the cells A1 800, A2 802 and A3 804, in order to perform the cell search for the S-SCH.

Meanwhile, in a synchronous system with the same transmission timing applied to different node Bs, different frequency resources may be used for transmitting the S-SCH in the adjacent cells belonging to the different node Bs, as shown in FIGS. 8A and 8B, in order to prevent interferences between the S-SCH sequences of the cells. For example, in the cell structure of FIG. 7, if the S-SCH is mapped as shown in FIG. 10, the adjacent cells may use different frequency resources for the S-SCH transmission so as to prevent interferences between them.

Figure 10:
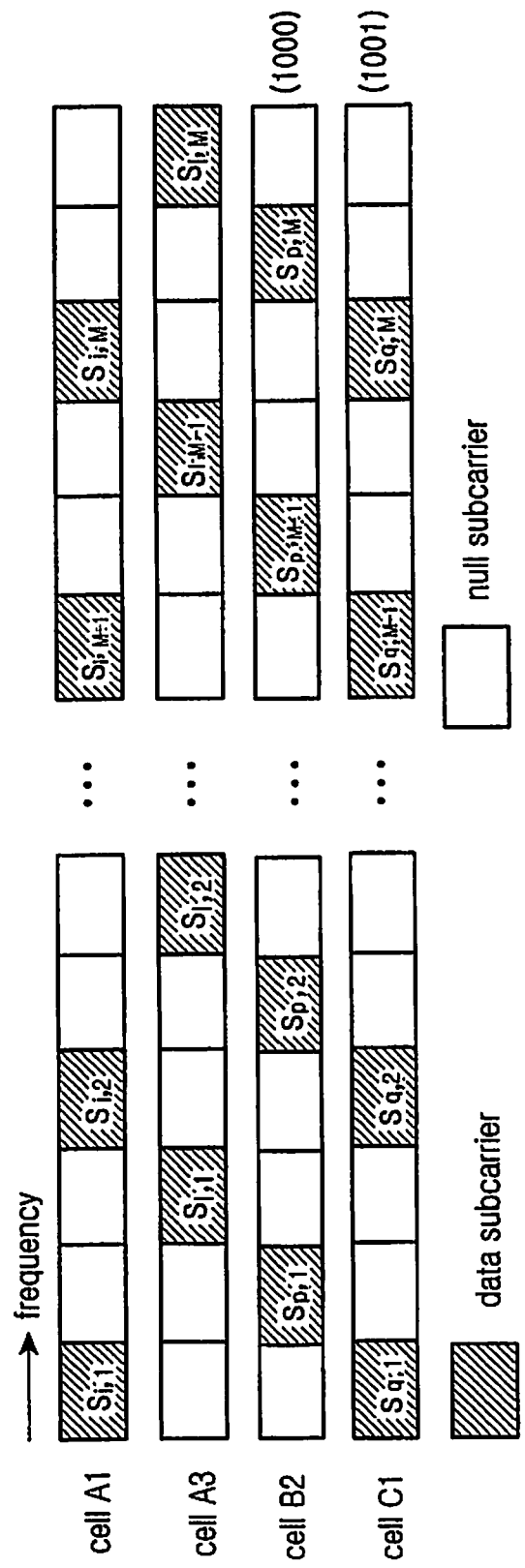
FIG. 10 illustrates each cell's S-SCH mapped to the frequency resources among the cells belonging to different nodes B according to a first embodiment of the present invention.

More specifically, because the cell B2 708 of FIG. 7 is adjacent to the cells A1 700 and A3 704 and not to the cell A2 702, it employs, for the S-SCH transmission, the same frequency resource 1000 as the cell A2 702, as shown in FIG. 10. In addition, because the cell C1 710 is adjacent to the cells B2 708 and A3 704, it employs, for the S-SCH transmission, the frequency resource 1001 not being used by them. In those cases described above, all the cells use the same sequence and frequency resources for transmitting the P-SCH, so that the user equipment may receive the soft-combined P-SCH signal.

Figure 11:
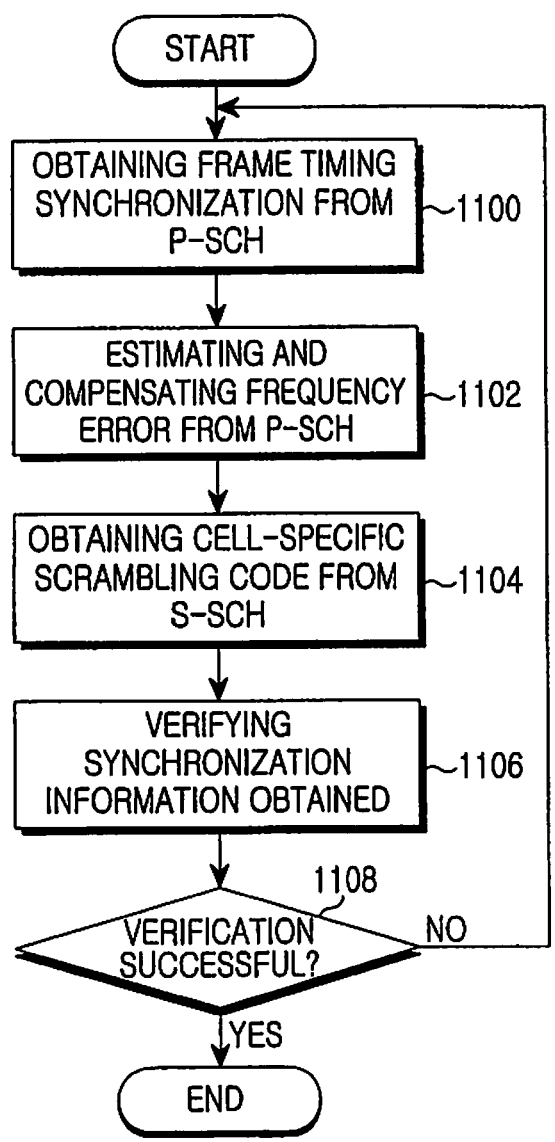
FIG. 11 illustrates the process of carrying out the cell search with the synchronization channel structure according to a first embodiment of the present invention.

FIG. 11 illustrates the process of the UE performing the cell search under the synchronization channel structure as shown in FIG. 6B. In step 1100, the UE detects the starting point of the P-SCH based on the fact that the same sequence is repeated in the P-SCH, as shown in FIG. 6A, in order to obtain the frame timing synchronization. This is achieved by discovering the received signal sample timing giving the maximum correlation value between the presently received signal and the signal received after a lapse of the sample sequence length of the P-SCH. After obtaining the frame timing synchronization, the user equipment proceeds to step 1102 to estimate the frequency error between the base station and the UE eliminated for obtaining the cell-specific scrambling code from the S-SCH. The evaluation of the frequency error may be achieved by correlating the normal P-SCH sequence and the received P-SCH sequence, both in the time region and in the frequency region.

Compensating for the estimated frequency error, the UE proceeds to step 1104 to obtain the cell-specific scrambling code from the received S-SCH. Then, the UE proceeds to step 1106 to verify the synchronization information obtained in the previous steps, and then to step 1108 to end the cell search, or to return to step 1100, according to whether the frame timing and the cell-specific code are verified. If the verification step 1106 only yields success of the P-SCH synchronization verification with failure of the cell-specific code verification, the UE may return to step 1104 to obtain the S-SCH synchronization.

Figure 12:
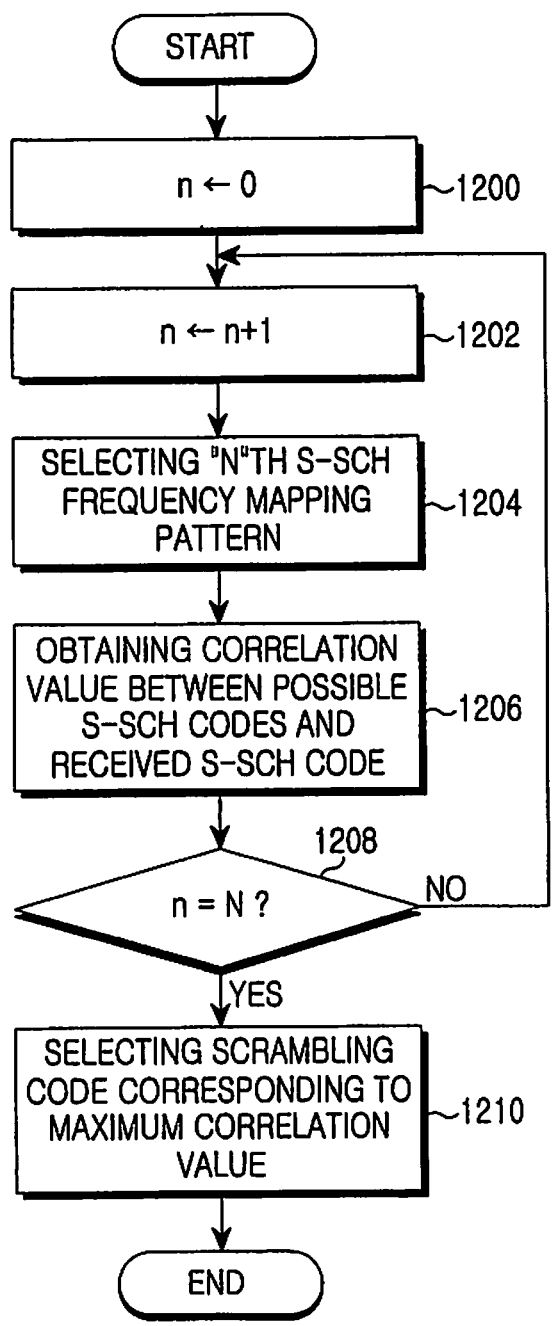
FIG. 12 illustrates the process of obtaining the S-SCH code in the cell search process of FIG. 11.

FIG. 12 illustrates the detailed process of the step 1104 as shown in FIG. 11 to obtain the cell-specific scrambling code from the S-SCH. In FIG. 12, N represents the number of possible frequency mapping patterns of the S-SCH, and n represents the index of the frequency-mapping pattern testing the synchronization of the present S-SCH code. If the frequency reuse factor is 3 as in FIG. 8A, N is equal to 3.

The user equipment sets n equal to 0 in step 1200, and then increases the value of n by 1. After selecting the frequency mapping pattern of the S-SCH corresponding to n in step 1204, the UE proceeds to step 1206 to obtain the correlation value between possible S-SCH codes and the received S-SCH code. The process from step 1202 to step 1206 is repeated until n reaches N. Namely, the process from step 1202 to step 1206 is repeated for all of the frequency mapping patterns. If n=N in step 1208, the UE proceeds to step 1210 to select the code and frequency mapping pattern corresponding to the maximum correlation value among the combinations of frequency mapping patterns and codes, and then ends the process of obtaining the S-SCH synchronization.

Figure 13:
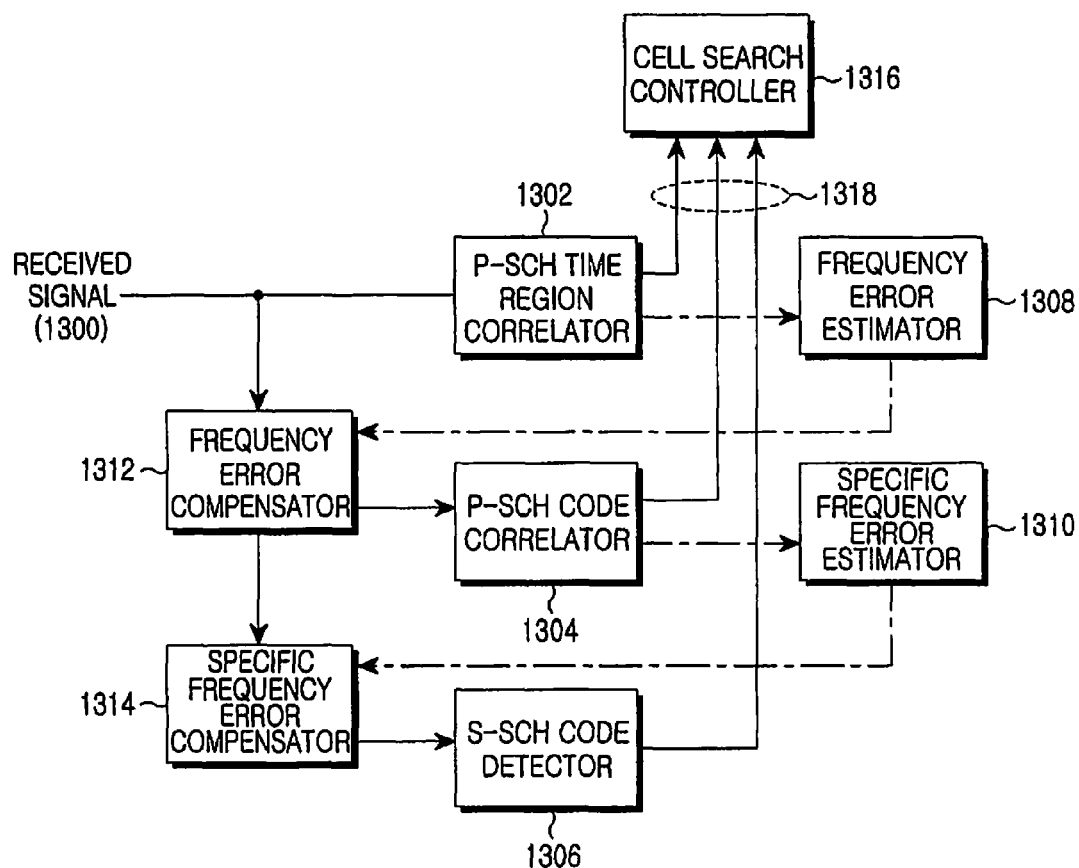
FIG. 13 illustrates the structure of the cell search receiver of the user equipment for the synchronization channel structure according to a first embodiment of the present invention.

FIG. 13 illustrates the receiver structure for performing the cell search process previously described. A P-SCH time region correlator 1302 correlates a received Analog to Digital (A/D) converted digital signal 1300 and the P-SCH in the time region to discover the timing producing the maximum correlation value, thus obtaining the frame timing synchronization. The frame timing synchronization information is delivered both to a frequency error estimator 1308 and to the cell search controller 1316 (1318), and the frequency error estimator 1308 estimates the frequency error between the base station and the UE through the time region correlation.

In the P-SCH structure of FIG. 6A, the frequency error value to be estimated by the frequency error estimator 1308 is limited below the subcarrier spacing. The estimated frequency error is compensated by a frequency error compensator 1312 and delivered to a P-SCH code correlator 1304 to be correlated in the frequency region of the P-SCH code in order to give a specific frequency error value. More particularly, a specific frequency error estimator 1310 compares the received P-SCH code with the originally defined P-SCH code $p_n$ (n=1, 2, . . . , N), as shown in FIG. 6B, in order to calculate its displacement represented by the number of the subcarriers passed along the frequency axis, thus estimating the specific frequency error. The specific frequency error is additionally compensated by a specific frequency error compensator 1314 delivered to an S-SCH code detector 1306, which carries out the process as shown in FIG. 12 to obtain the cell-specific scrambling code delivered to a cell search controller 1316 (1318).

Example 2

The first embodiment of the present invention considers the case of the cell group code not being transmitted. Meanwhile, in the case of an asynchronous system such as WCDMA, there may be a large number of cell-specific scrambling codes which can considerably increase the complexity of the cell search and degrade the performance of the cell search due to the numerous cell-specific scrambling codes transmitted without the cell group code, as in the first embodiment. Hence, the embodiment considers the case of transmitting both the cell group code and the cell-specific scrambling code through the S-SCH.

Figure 14A:
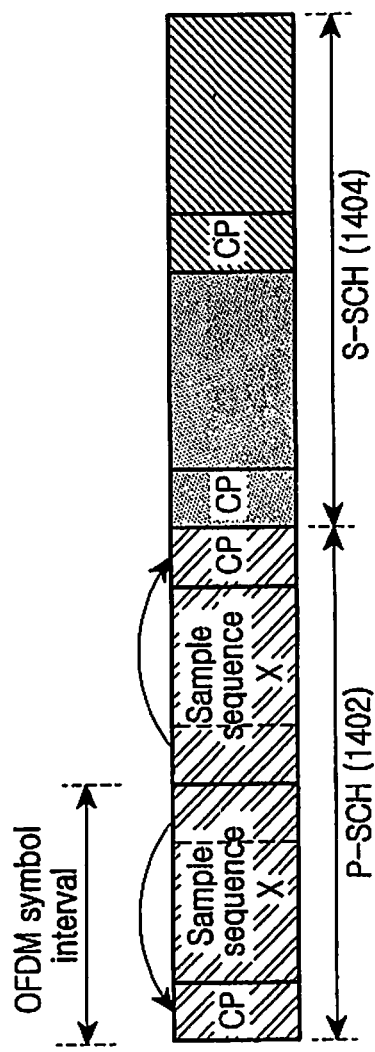
FIG. 14A illustrates the structure of the synchronization channel according to a second embodiment of the present invention in the time region.
Figure 14B:
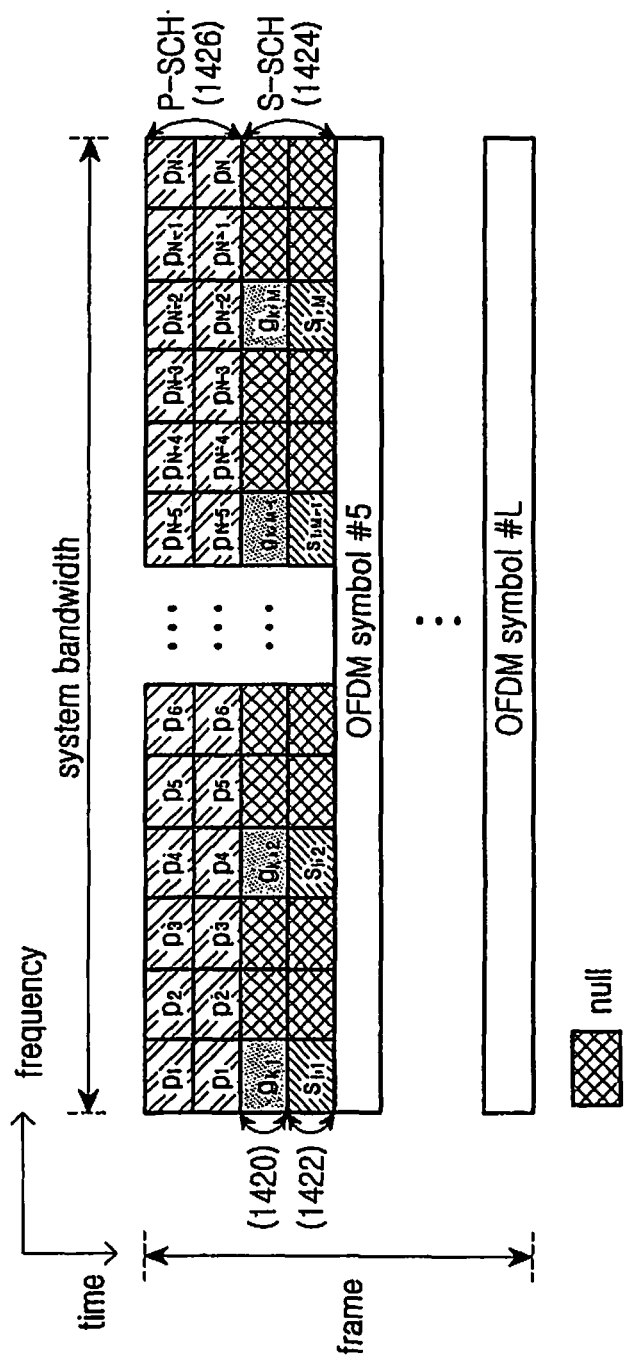
FIG. 14B illustrates the structure of the synchronization channel according to a second embodiment of the present invention, both in the frequency region and in the time region.

FIGS. 14A and 14B illustrate the synchronization channel structure according to the second embodiment of the present invention. In FIG. 14A, the synchronization channel according to the second embodiment differs from the first embodiment of FIG. 6A in that the S-SCH 1404 occupies two OFDM symbols. The difference is an additional OFDM symbol 1420 of the S-SCH for transmitting the cell group code prior to the OFDM symbol 1422 for transmitting the cell-specific scrambling code. The P-SCH structure 1402, 1426 is the same as the P-SCH structure 600, 610 of the first embodiment as shown in FIGS. 6A and 6B.

In FIG. 14B, the S-SCH 1420 for transmitting the cell group code also employs the frequency reuse factor with a value of 3. This is to map adjacent cells to different frequency resources in order to prevent the interferences between the cells because the cell group code sequence $g_{k,m}$ becomes different according to the cells as the cell-specific scrambling sequence $s_{k,m}$.

Figure 15:
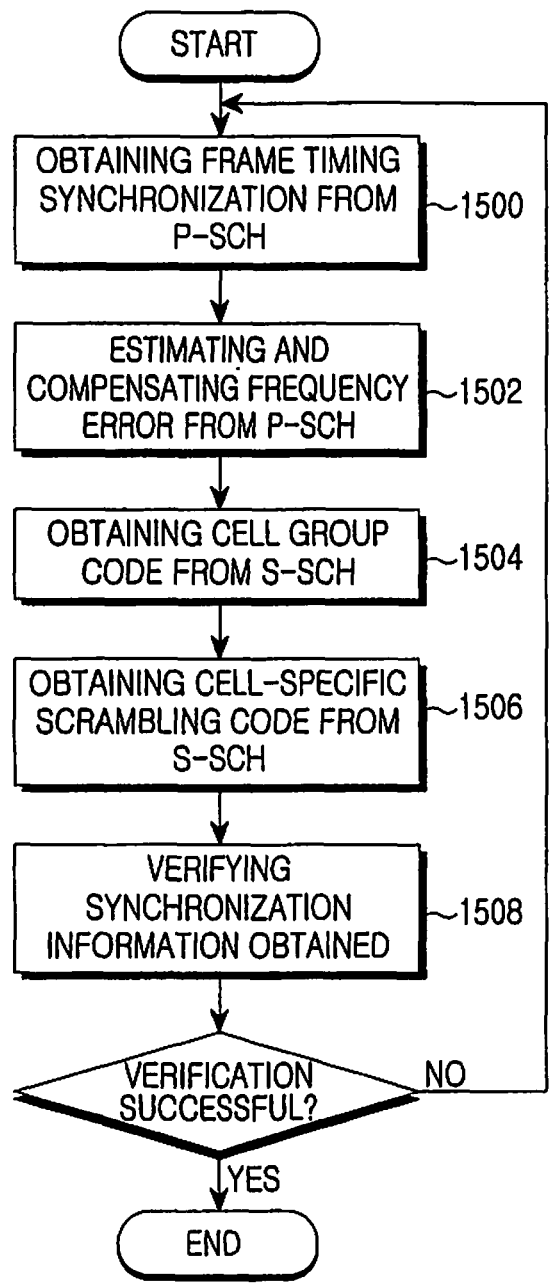
FIG. 15 illustrates the process of carrying out the cell search with the synchronization channel structure according to a second embodiment of the present invention.

FIG. 15 illustrates the process of carrying out the cell search for the synchronization channel structure according to the second embodiment of the present invention. The difference between the embodiment of FIG. 15 and the first embodiment as shown in FIG. 11 is the addition of step 1504 for obtaining the cell group code from the S-SCH. Namely, this embodiment includes step 1504 for obtaining the cell group code between step 1502 for estimating and compensating the frequency error from the P-SCH, and step 1506 for obtaining the cell-specific scrambling code from the S-SCH.

Another difference is that the verification of the synchronization obtained in step 1508 corresponding to the step 1206 of the first embodiment as shown in FIG. 12 is performed only for the cell-specific scrambling code belonging to the cell group code obtained in step 1504.

Figure 16:
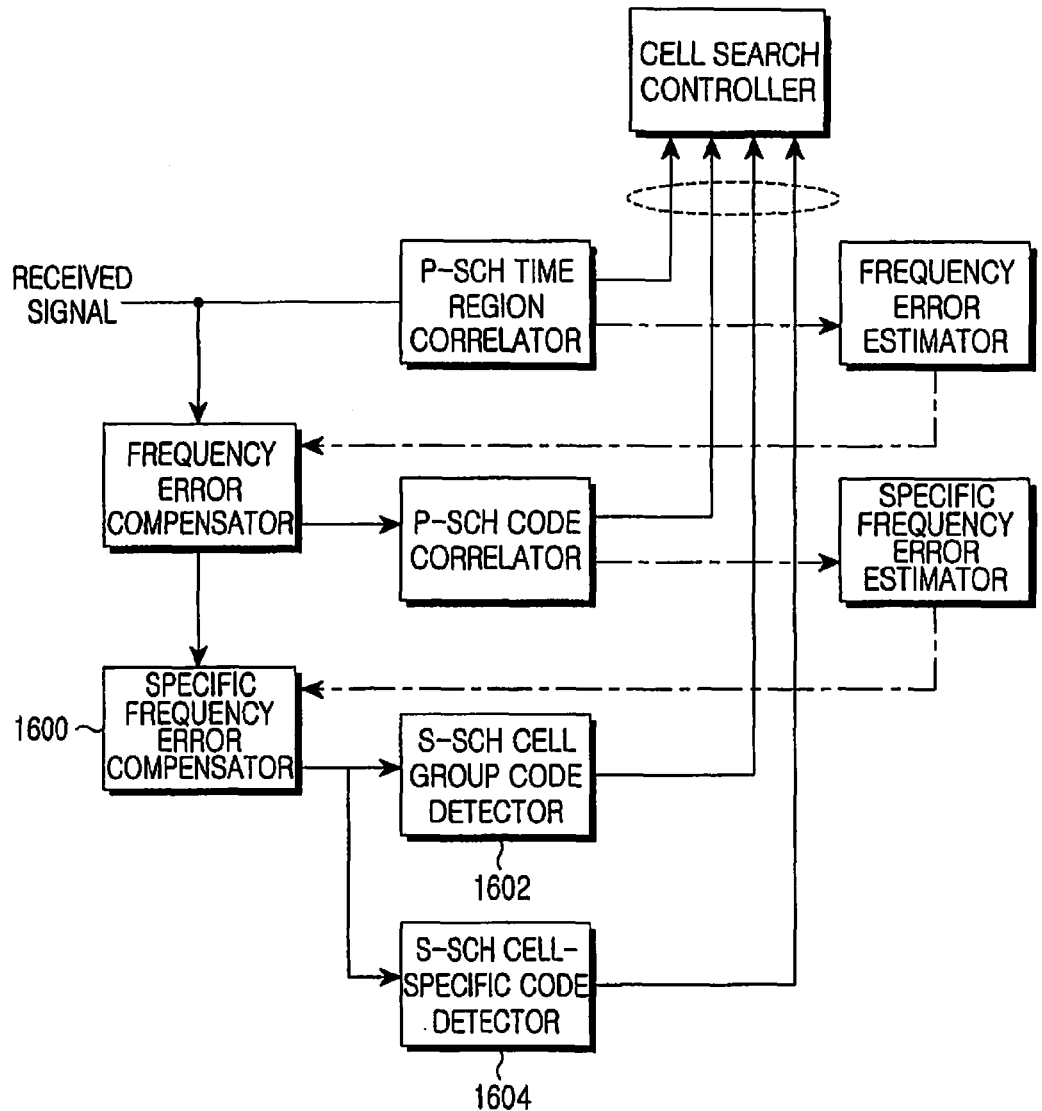
FIG. 16 illustrates the structure of the cell search receiver for the synchronization channel structure according to a second embodiment of the present invention.

FIG. 16 illustrates the structure of the cell search receiver according to the synchronization channel structure of the second embodiment of the present invention. The difference between the embodiment of FIG. 16 and the first embodiment is the addition of an S-SCH cell group code detector 1602 for obtaining the cell group code from the S-SCH. Namely, the specific frequency error compensator 1600 delivers the specific frequency error compensated received signal to the S-SCH cell group code detector 1602 to produce the cell group code, which has a scrambling code used in order for the S-SCH cell-specific code detector 1604 to detect the cell-specific scrambling code.

Example 3

The third embodiment of the present invention considers when the S-SCH transmits only the cell group code, and the cell-specific scrambling code for obtaining the cell ID is transmitted through a pilot channel. Because obtaining the cell ID is achieved by obtaining the cell-specific scrambling code used in the pilot, the cell search process also includes the process of obtaining the cell ID through the pilot channel.

Figure 17:
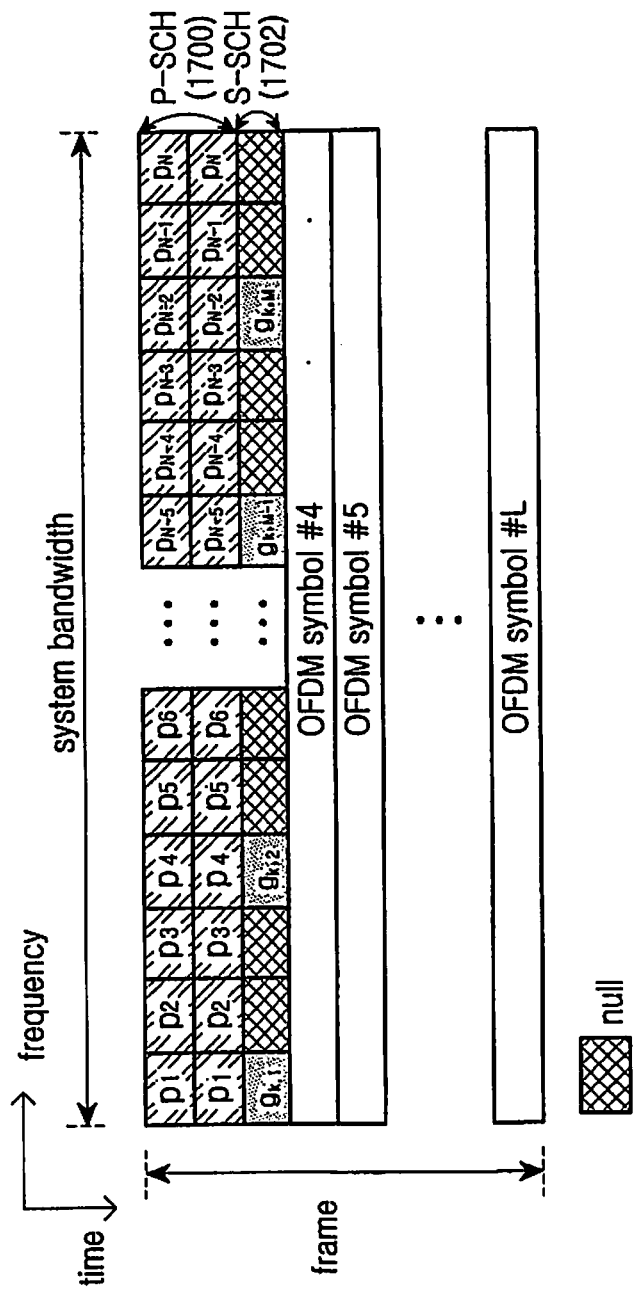
FIG. 17 illustrates the structure of the synchronization channel according to a third embodiment of the present invention, both in the frequency region and in the time region.

FIG. 17 illustrates the synchronization channel structure according to the third embodiment of the present invention. This embodiment is basically the same as the structure of FIG. 6B, except that the S-SCH 612 of FIG. 6B transmits the cell-specific scrambling sequence $s_{k,\,m}$, while the S-SCH 1702 of FIG. 17 transmits the cell group code sequence $g_{k,\,m}$.

Figure 18:
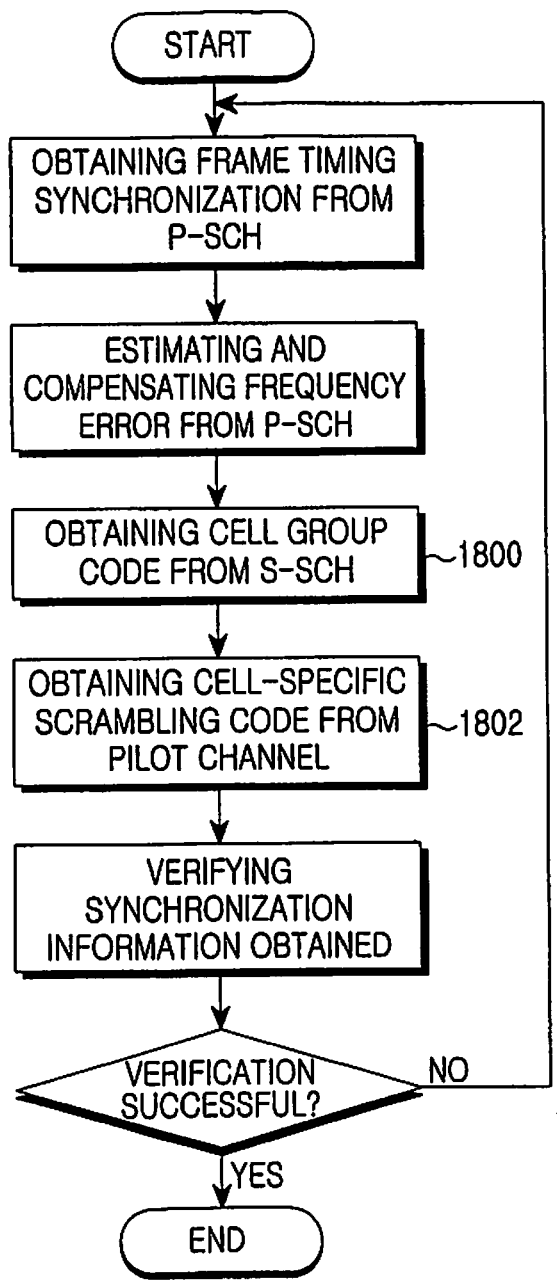
FIG. 18 illustrates the process of carrying out the cell search with the synchronization channel structure according to a third embodiment of the present invention.

FIG. 18 illustrates the process of carrying out the cell search according to the third embodiment of the present invention. This process is almost the same as the process of the second embodiment as shown in FIG. 15, except that step 1802 for obtaining the cell-specific code is achieved through the pilot channel after obtaining the cell group code through the S-SCH in step 1800.

In addition, the cell search receiver for carrying out the process of FIG. 18 is the same as that of the second embodiment as shown in FIG. 16, except that the S-SCH cell-specific code detector 1604 of FIG. 16 is replaced by the pilot channel cell-specific code detector.

FIG. 19 illustrates the structure of a transmitter for producing the synchronization channel according to the first to third embodiments of the present invention. The P-SCH sequence generator 1900 and the S-SCH sequence generator 1902 respectively generate the P-SCH and S-SCH sequences, and the additional channel sequence generator 1904 generates other channels. The channels are delivered through a multiplexer 1906 to a subcarrier mapping part 1908 under a controller 1912.

The subcarrier mapping part 1908 maps the output signals of the multiplexer to the input terminal of IFFT 1910 according to the subcarrier mapping rules of the channels. For example, each sequence chip $s_{i,\,m}$ of the S-SCH 612 shown in FIG. 6B is mapped through the subcarrier mapping part 1908 to the input terminal of the IFFT 1910 according to the corresponding frequency mapping pattern under the control of the controller 1912. If all the sequence chips of the S-SCH 612 are mapped to the input terminal of the IFFT 1910, the transmission OFDM signal 1914 corresponding to the S-SCH 612 is produced.

As described above, the present invention has the following effects. Different frequency reuse factors are used to obtain the synchronization channel based on the fact that the P-SCH and S-SCH constituting the synchronization channel for performing the downlink cell search have different interference characteristics between adjacent cells. This improves the reception performance by combining the P-SCH sequences from several cells, and the entire cell search performance of the S-SCH by preventing interferences between adjacent cells.

In addition, when applying the frequency reuse factor greater than 1 to the S-SCH, the adjacent cells interlace the subcarriers used in the S-SCH so as to widely and uniformly spread the synchronization channels transmitted in each of the cells over a wide band, thus enabling the search and detection of the adjacent cells to be smoothly performed.

While the present invention has been shown and described with reference to certain embodiments thereof, it will be understood by those skilled in the art that various changes in form and details may be made therein without departing from the spirit and scope of the invention.

What is claimed is:

1. A method for communication, the method comprising:
identifying a primary synchronization sequence;
identifying a secondary synchronization sequence and another secondary synchronization sequence that is different from the secondary synchronization sequence, and the secondary synchronization sequence and the another secondary synchronization sequence are associated with a cell identifier;
transmitting the primary synchronization sequence in center subcarriers in a first Orthogonal Frequency Division Multiplexing (OFDM) symbol;
transmitting the secondary synchronization sequence in the center subcarriers in a second OFDM symbol, the second OFDM symbol being adjacent to the first OFDM symbol;
transmitting the primary synchronization sequence in a third OFDM symbol; and
transmitting the another secondary synchronization sequence in a fourth OFDM symbol,
wherein one of the first and second OFDM symbols in the frame is adjacent to one of the third and fourth OFDM symbols in the frame, and
wherein the center subcarriers are part of a system bandwidth, a part of the center subcarriers in the first OFDM symbol is not used for transmission of the primary synchronization sequence, and a part of the center subcarriers in the second OFDM symbol is not used for transmission of the secondary synchronization sequence.

2. The method of claim 1, wherein at least one subcarrier other than the center subcarriers is used for signal transmission other than the primary synchronization sequence and the secondary synchronization sequence.

3. The method of claim 1, wherein the secondary synchronization sequence is associated with a cell specific scrambling sequence.

4. An apparatus for communication, the apparatus comprising:
a generator configured to identify a primary synchronization sequence, and to identify a secondary synchronization sequence and another secondary synchronization sequence that is different from the secondary synchronization sequence, and the secondary synchronization sequence and the another secondary synchronization sequence are associated with a cell identifier; and
a transmitter configured to transmit the primary synchronization sequence in center subcarriers in a first Orthogonal Frequency Division Multiplexing (OFDM) symbol, to transmit the secondary synchronization sequence in the center subcarriers in a second OFDM symbol, the second OFDM symbol being adjacent to the first OFDM symbol, to transmit the primary synchronization sequence in a third OFDM symbol, and to transmit the another secondary synchronization sequence in a fourth OFDM symbol,
wherein one of the first and second OFDM symbols in the frame is adjacent to one of the third and fourth OFDM symbols in the frame, and
wherein the center subcarriers are part of a system bandwidth, a part of the center subcarriers in the first OFDM symbol is not used for transmission of the primary synchronization sequence, and a part of the center subcarriers in the second OFDM symbol is not used for transmission of the secondary synchronization sequence.

5. The apparatus of claim 4, wherein at least one subcarrier other than the center subcarriers is used for signal transmission other than the primary synchronization sequence and the secondary synchronization sequence.

6. The apparatus of claim 4, wherein the secondary synchronization sequence is associated with a cell specific scrambling sequence.

7. A method for communication, the method comprising:
receiving a first Orthogonal Frequency Division Multiplexing (OFDM) symbol of a frame, the first OFDM symbol including a primary synchronization sequence;
receiving a second OFDM symbol in the frame, the second OFDM symbol including a secondary synchronization sequence associated with a cell identifier;
receiving a third OFDM symbol in the frame, the third OFDM symbol including the primary synchronization sequence;
receiving a fourth OFDM symbol in the frame, the fourth OFDM symbol including another secondary synchronization sequence, which is different from the secondary synchronization sequence and associated with a cell identifier, and
performing the cell search based on at least one of the received first OFDM symbol and the received second OFDM symbol and at least one of the received third OFDM symbol and the received fourth OFDM symbol,
wherein the primary synchronization sequence is received in center subcarriers in the first OFDM symbol and the secondary synchronization sequence is received in the center subcarriers in a second OFDM symbol, the second OFDM symbol being adjacent to the first OFDM symbol,
wherein the center subcarriers are part of a system bandwidth, a part of the center subcarriers in the first OFDM symbol is not used for transmission of the primary synchronization sequence, and a part of the center subcarriers in the second OFDM symbol is not used for transmission of the secondary synchronization sequence,
wherein the primary synchronization sequence is received in the center subcarriers in the third OFDM symbol and the another secondary synchronization sequence is received in the center subcarriers in the fourth OFDM symbol, and
wherein one of the first and second OFDM symbols in the frame is adjacent to one of the third and fourth OFDM symbols in the frame.

8. The method of claim 7, wherein at least one subcarrier other than the center subcarriers is used for signal reception other than the primary synchronization sequence and the secondary synchronization sequence.

9. The method of claim 7, wherein the secondary synchronization sequence is associated with a cell specific scrambling sequence.

10. An apparatus for communication, the apparatus comprising:
a receiver configured to receive a first Orthogonal Frequency Division Multiplexing (OFDM)symbol of a frame, the first OFDM symbol including a primary synchronization sequence, to receive a second OFDM symbol in the frame, the second OFDM symbol including a secondary synchronization sequence associated with a cell identifier, to receive a third OFDM symbol in the frame, the third OFDM symbol including the primary synchronization sequence, and to receive a fourth OFDM symbol in the frame, the fourth OFDM symbol including another secondary synchronization sequence, which is different from the secondary synchronization sequence, and
a controller configured to perform the cell search based on at least one of the received first OFDM symbol and the received second OFDM symbol and at least one of the received third OFDM symbol and the received fourth OFDM symbol,
wherein the primary synchronization sequence is received in center subcarriers in the first OFDM symbol and the secondary synchronization sequence is received in the center subcarriers in a second OFDM symbol, the second OFDM symbol being adjacent to the first OFDM symbol,
wherein the center subcarriers are part of a system bandwidth, a part of the center subcarriers in the first OFDM symbol is not used for transmission of the primary synchronization sequence, and a part of the center subcarriers in the second OFDM symbol is not used for transmission of the secondary synchronization sequence,
wherein the primary synchronization sequence is received in the center subcarriers in the third OFDM symbol and the another secondary synchronization sequence is received in the center subcarriers in the fourth OFDM symbol, and
wherein one of the first and second OFDM symbols in the frame is adjacent to one of the third and fourth symbols in the frame.

11. The apparatus of claim 10, wherein at least one subcarrier other than the center subcarriers is used for signal reception other than the primary synchronization sequence and the secondary synchronization sequence.

12. The apparatus of claim 10, wherein the secondary synchronization sequence is associated with a cell specific scrambling sequence.

* * * * *